United States Patent [19]

Niebauer

[11] Patent Number: 4,957,396
[45] Date of Patent: Sep. 18, 1990

[54] CUTTING INSERT WITH CHIP CONTROL
[75] Inventor: Kenneth L. Niebauer, Raleigh, N.C.
[73] Assignee: Kennametal Inc., Latrobe, Pa.
[21] Appl. No.: 252,425
[22] Filed: Sep. 30, 1988
[51] Int. Cl.$^5$ .............................................. B23P 15/28
[52] U.S. Cl. ...................................... 407/114; 407/115
[58] Field of Search ................ 407/114, 115, 113, 116

[56] References Cited

U.S. PATENT DOCUMENTS

| | | | |
|---|---|---|---|
| 2,688,791 | 5/1953 | Luers et al. | 407/117 |
| 3,339,442 | 9/1968 | Jones et al. | |
| 3,557,416 | 1/1971 | Jones . | |
| 3,754,309 | 8/1973 | Jones et al. | 407/107 |
| 3,762,005 | 10/1973 | Erkfritz . | |
| 4,011,050 | 3/1977 | Zinner | 407/117 |
| 4,116,576 | 9/1978 | Gawryk, Sr. . | |
| 4,360,297 | 11/1982 | Weber . | |
| 4,778,311 | 10/1988 | Niemi | 407/116 |
| 4,834,592 | 5/1989 | Niebauer et al. | 407/117 |

FOREIGN PATENT DOCUMENTS 1363442 of 0000 United Kingdom .

OTHER PUBLICATIONS

Econo–Groove, Catalogue, p. 63.
Iscar Catalogue, p. 11.
Sanovik Catalogue, p. 118.

Primary Examiner—Frederick R. Schmidt
Assistant Examiner—Lawrence Cruz
Attorney, Agent, or Firm—Thomas R. Trempus

[57] ABSTRACT

An improved cutting insert with chip control features having an insert body having wall regions, sides and top and bottom walls adapted for mounting in a pocket in a holder. The insert body has cutting edges and a diagonal notch or the like in the top and bottom sides. A land region extends rearwardly from the end wall region toward the respective top or bottom wall and defines a surface region of a predetermined width. An ascending wall or back ramp initiates in a portion of the land and terminates at the respective top or bottom wall. A chipbreaker depression initiates in a forward portion of the land proximate the cutting edge and extends into and bisects the back ramp.

20 Claims, 3 Drawing Sheets

CUTTING INSERT WITH CHIP CONTROL

FIELD OF THE INVENTION

The invention is directed to cutting inserts, especially metal cutting inserts with chip control. The invention also provides a method for the manufacture of such cutting inserts.

BACKGROUND OF THE INVENTION

Cutting inserts are well known and a large percentage of them are of the throw away design. Such inserts are detachably clamped on a holder and then are discarded when they become dull or chipped. Throw away inserts are usually indexable and often are reversible so that an insert can be provided with at least two cutting edges for selective presentation to the cutting position.

The provision of two or more cutting edges on the insert makes it economical to use and is particularly important with respect to throw away inserts because of the high cost of the materials from which the inserts are produced, especially when the material is, for example, a cemented metal carbide.

The inserts must be securely and accurately held in place within an insert holder during the cutting operation. This is especially true when the inserts are employed with numerically controlled machines which depend for accuracy upon an accurately located and firmly supported insert. When the inserts are of a substantial area, it is possible to fix the insert both accurately and firmly within the pocket of a toolholder by providing the insert with a central hole and the toolholder with a pin-type clamping device. In other cases, such inserts may be held in place by a top clamp. Examples of such holders are found in U.S. Pat. No. 3,754,309; 3,399,442 and 3,762,005 and British Patent Specification 1,363,542.

The main object of metal machining is the shaping of the new work surface. Much attention is paid to the formation of the chip during the machining process, even though the chip is a waste product. This is because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the metal or alloy of the workpiece.

It has been a common practice to place a mechanical chip breaking member between the insert and the clamp securing the insert to the tool in order to provide at least a degree of chip control during the cutting operation. This arrangement presents the obvious drawback of increasing the effective area necessary for metal cutting operations with a given tool.

Because chip control is an important consideration in metal cutting operations, it has been a long standing objective in the art of metal cutting to develop improved chip breaking members for use with tools as well as improved designs for the cutting inserts. One example of a cutting insert with chip breaking capabilities is the cut-grip inserts "GIP" available from ISCAR. The ISCAR insert has a land with a pair of generally parallel, elongated and elevated members which deform the metal chips as they are removed from the workpiece. Another example of a cutting insert with features designed to provide chip control is the Econ-o-grove insert manufactured by Valenite Corporation. This insert has parallel side walls extending along a continuous descending wall, floor and back wall of constant radius. Another example of a cutting insert with a chipbreaker style is commercially available from Sandvik and is characterized by a non-continuous front face which may not provide a flat finish to the cut groove in a workpiece.

It is an object of the invention to provide an insert with improved chip control characteristics.

It is another object of this invention to provide a method of manufacturing an insert with improved chip control.

It is yet another object of this invention to provide an improved chip control insert configured to cooperate with a clamping element of an insert toolholder.

SUMMARY OF THE INVENTION

The invention provides both a cutting insert with a unique configuration that results in improved chip control and a method for manufacturing an insert. The improved cutting insert with chip control features comprises an insert body having end wall regions and sides and top and bottom walls substantially perpendicular to the sides. The insert body is adapted for mounting in a pocket in an holder with one end region exposed. The insert body is invertible about an axis perpendicular to the sides thereof and the insert body has cutting edges at the the end wall regions, whereby in each inverted position of the insert body a respective cutting edge is presented uppermost at the same end of the insert body.

The top and bottom walls or seating surfaces of the insert body define therein in a preferred embodiment a diagonal notch, which extends thereacross at an angle such that each notch when uppermost forms substantially the same angle with the sides of the insert. In alternative embodiments, partial notch means or depressions can be provided in the top or side walls of the insert for cooperation with a clamping mechanism.

Each of the end wall regions of the insert defines at least in part a cutting edge for presentation to a workpiece. A land region extends rearwardly from the end wall region toward the respective top or bottom wall and defines a surface region of a predetermined width and area. An ascending wall or back ramp initiates in a rearward portion of the land and terminates proximate the respective top or bottom wall. A chipbreaker depression initiates in a forward portion of the land and terminates aft of the ascending wall. Preferably, the chipbreaker depression is of a predetermined width relative to the width of the inserts's cutting edge and has a pair of parallel side walls which are generally perpendicular to the respective end wall regions. The chipbreaker depression has a floor extending from the forward portion of the land to the top (or bottom wall) of the insert and the floor is characterized by a constant radius. The height and angular disposition of the ascending wall relative to the land and top (or bottom wall) of the insert body are a function of the ultimate application of the insert, particularly the feed rate at which the insert is to be employed.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
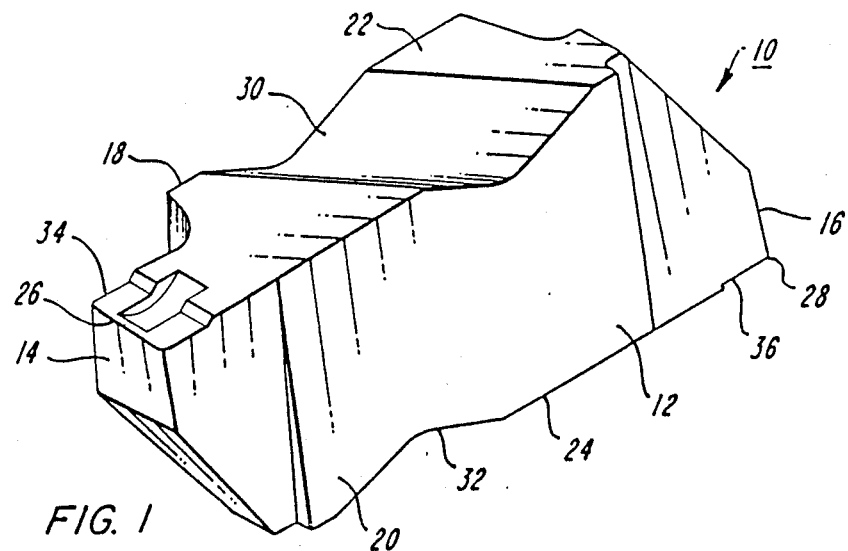
FIG. 1 is an isometric view of a cutting insert configured for chip control, all according to the present invention.

An improved cutting insert with chip control features is isometrically shown in FIG. 1 and generally indicated by the reference character 10. The insert 10 comprises an insert body 12 having a first flank or end wall 14, a second opposed flank or end wall 16, first and second sides 18 and 20 and top and bottom seating surfaces or walls 22 and 24. The insert body 12 is preferably made from a hard cemented carbide such as tungsten or titanium carbide or tungsten titanium carbide or TiC-TiN. At the juncture of one end part 14 and top wall 22 there is one cutting edge 26. At the juncture of the other end wall region 16 and the bottom wall 24 there is a second cutting edge 28.

The insert body 12 of the insert 10 is formed with means for cooperating with a toolholder insert clamping mechanism which will be described in detail below. While several styles of such means for cooperating with the clamping mechanism are known in the art, in the preferred embodiment, the insert body 12 has a diagonal groove 30 in the top wall 22 and a diagonal groove 32 in the bottom wall 24 of the insert. Each groove 30 and 32 is preferably "V" shaped in cross section and adapted for engagement by the toolholder assembly which will be described in connection with FIG. 2. With the insert configuration as described above, in each inverted position of the insert body 12, a respective cutting edge is presented uppermost at the same end of the insert body. The diagonal notch or grooves 30 and 32 extending across the insert body are disposed at an angle such that each notch, when uppermost, forms substantially the same angle with the sides 18 and 20 of the insert body 12. Also, in each inverted position, the insert body 12 presents an end wall region of the insert defining at least in part the cutting edge 26 or 28 to a workpiece.

Figure 3:
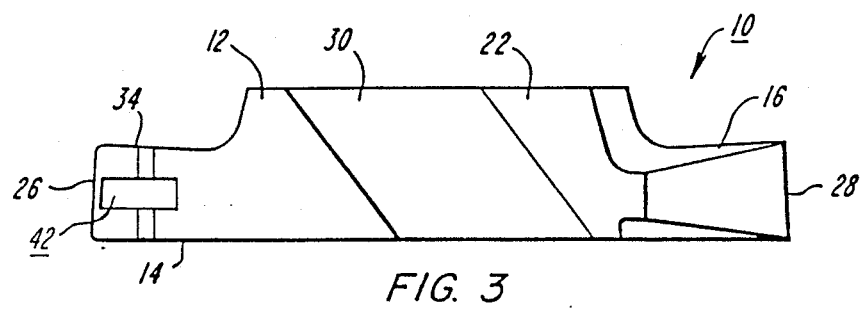
FIG. 3 is a plan view of the cutting insert of this invention.
Figure 4:
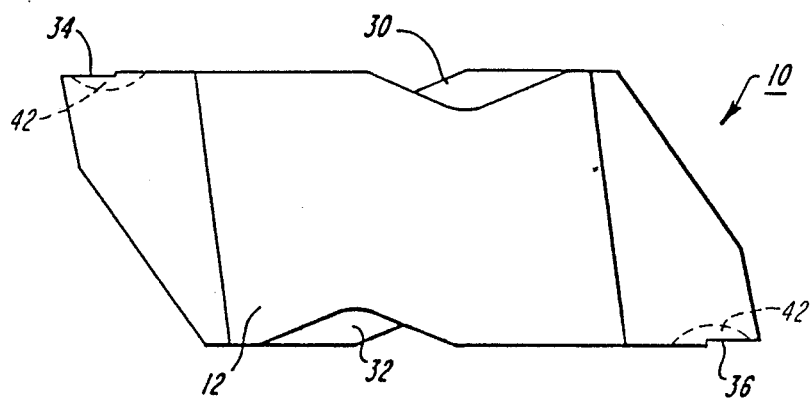
FIG. 4 is a side view of the insert of this invention.
Figure 5:
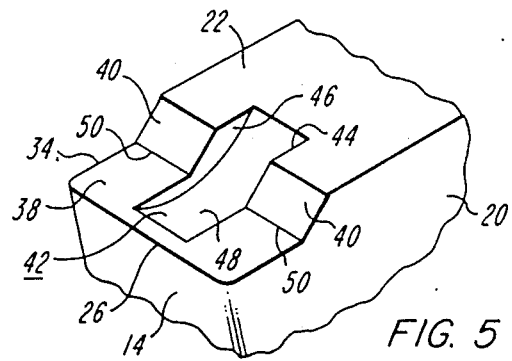
FIG. 5 is an enlarged fragment isometric view illustrating the end region of the insert of FIG. 1.

As can be seen more clearly through consideration of FIGS. 3, 4 and 5, in conjunction with FIG. 1, the insert body 12 includes at each end region thereof, a land region 34 and 36 extending rearwardly from the respective end wall regions 14 and 16 toward the respective top or bottom wall 22 and 24. Each land region defines a generally planar surface region 38 of a predetermined width and area. It is to be appreciated that the insert 10 of this invention is reversible, and therefore the detailed features described in conjunction with one side or end region of the insert are present in the other side or end region thereof.

Figure 6:
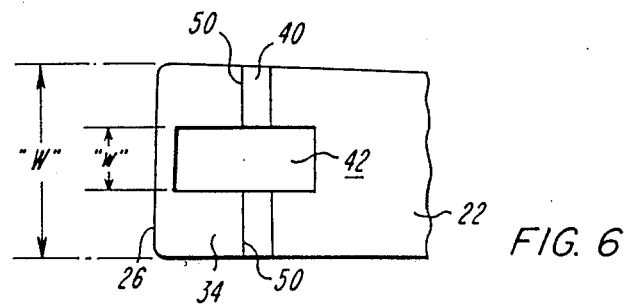
FIG. 6 is an enlarged fragment isometric plan view illustrating the end region of the insert of FIG. 1.
Figure 7:
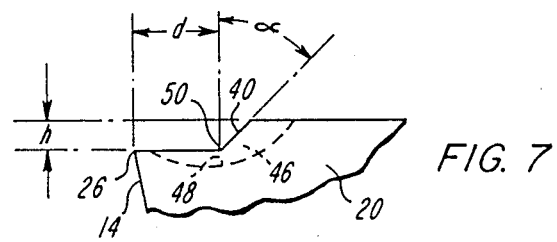
FIG. 7 is an enlarged fragment isometric elevational view illustrating the end region of the insert of FIG. 1.

Considering the end wall region 14, there is formed at least in part a cutting edge 26 for presentation to a workpiece. The land region 34 extends rearwardly from the end wall region cutting edge 26 toward the ascending wall or back ramp 40 which in turn terminates at the forward portion of the top wall 22. The ascending wall or back ramp 40 initiates in a rearward portion of the land 34 and terminates proximate the top wall 22. A chipbreaker depression 42 initiates in a forward portion of the land 34, proximate the cutting edge 26 and terminates aft of the ascending wall 40. As can be seen in FIGS. 5 through 7, the chipbreaker depression 42 bisects the ascending wall 40, such that two step like features are present to cooperate with the chipbreaker depression to effectively establish chip control. Preferably, the chipbreaker depression 42 is of a predetermined width "w" relative to the width "W" of the inserts's cutting edge 26. Preferably, the chipbreaker depression width "w" is between approximately one-third to one-half the width "W" of the inserts's cutting edge 26. The chipbreaker depression 42 has a pair of parallel side walls 44 and 46 which are generally perpendicular to the end wall region 14 and cutting edge 26. A chipbreaker depression floor 48 extends from the forward portion of the land, proximate the cutting edge 26, to the top 22 of the insert body 12. The floor 48 is preferably characterized by a constant radius and is configured so as to create a deformation of the cut chip. Specifically, the chip becomes "U" shaped and the overall width of the chip is reduced relative to the width of the cut groove. The back ramp then serves to help guide the "U" shaped chip back on itself at a location aft of the workpiece. Thus, the finished surface of the workpiece is substantially protected against the potential of damage being inflicted by chips striking it. The constant radius of the floor is between approximately 10 to approximately 18 degrees relative to an imaginary planar surface defined by the insert cutting edge. By providing the chipbreaker structures aft of the cutting edge as in the present invention, the insert is assured of having a straight cutting edge and the workpiece is assured of a good, flat finished surface.

The distance "d" from the cutting edge 26 to the base 50 of the ascending wall 40, i.e., the point of intersection of the ascending wall 40 and the land 34, is a function of the ultimate metal cutting application in general and the feed rate of that application in particular. Feed rate, is also referred to as "feed" and "feed per revolution (F.P.R.)" and is the amount of motion of the cutting tool into the workpiece for each revolution, stroke, or unit of time. This is controlled in all machining areas and must be correct if an operation is to be successful. This parameter of the operation is predetermined and based on this established value, the value of the insert's dimension "d" itself is defined. Preferably, based on the established value of the feed rate, the dimension "d" is selected to be approximately three (3) to five (5) times greater. The height "h" of the ascending wall 40 relative to the land 34 is preferably between 0.005 to 0.020 inches. The angular disposition alpha of the ascending wall 40 relative to an imaginary line perpendicular to the land 34 is preferably between approximately 30 to 60 degrees.

It has been found when cutting metal with the insert of the present invention that a chip coming off a workpiece in a light feed comes off the land area of the insert and strikes the ascending wall 40 wherein breakage is caused by the force of the chip's impact with either the ascending wall or the chip itself as the chip is directed back toward the workpiece. The chip coming from the workpiece forms a generally "U" shaped cross section as a result of the chip control feature of the insert 10.

Figure 2:
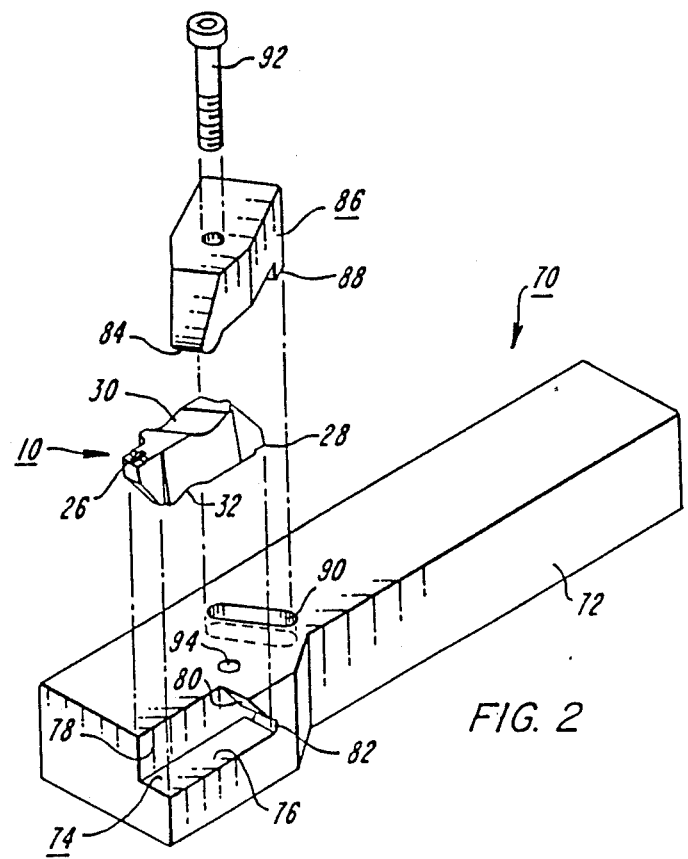
FIG. 2 is an exploded perspective view illustrating a typical holder and clamping arrangement for use in combination with the cutting insert this invention.

Turning now to FIG. 2, there is shown a toolholder 70 which is ideally suited for use in combination with the insert 10 of this invention. The toolholder 70 is in the form of a bar-like steel member 72 adapted for being clamped in a tool support of any suitable type. At one end of the member 72 there is an insert pocket 74 having a bottom wall 76, a side wall 78 and a back wall 80. Advantageously, an undercut is provided at the juncture of the bottom and back walls as indicated at 82 in order to protect the cutting edge 26, 28 of the insert 10 which is disposed in that region in each clamped position of the insert 10.

It will be noted that bottom and side walls 76 and 78 of the pocket are at right angles to each other whereas back wall 80 may be at a right angle to side wall 78 but converges with bottom wall 80 in the direction toward the back of the pocket. This pocket 74 is adapted for receiving an insert 10 therein. As described above, the insert 10 is provided with "V" shaped notches or grooves 30 and 32. These grooves 30 and 32 are adapted for engagement by the rounded nose 84 on the one end of one leg of a clamp member 86 which is in the form of an inverted "U" shaped member.

Clamping member 86 has a further leg 88 adapted for being received in a recess 90 formed in the top of the holder 70. A clamp screw 92 extends through a hole in the clamp member 86 between the legs thereof and into a threaded hole 94 provided in the top wall of the holder.

When the insert is placed in the pocket, the clamp member is put in position, and screw 92 is tightened up, and the insert is pressed firmly against the bottom wall 76 of the pocket while simultaneously being drawn toward walls 78 and 80. The insert is thus fixedly clamped in the pocket in the holder and is accurately located therein by being forced against the side walls of the pocket.

The side wall 78 of the pocket is preferably at a slight angle, approximately about 3 degrees, to the longitudinal axis of the holder 70. For this reason, the opposite ends of the insert are shaped in such a manner as to compensate for the small angularity of the wall 78 to the longitudinal axis of the holder 70.

A more detailed description of this as well as several other clamping arrangements and toolholders which can be advantageously utilized with the subject cutting insert can be had through a review of U.S. Pat No. 3,754,309, entitled "Cutting Insert and Clamping Arrangement Therefor," which patent is assigned to the assignee of the present invention and incorporated by reference herein.

The present invention is also directed to an improved method for manufacturing a cutting insert with chip control features. The insert body 12 with the chip control features described herein can be manufactured by a conventional molding process or by a combination of the molding process and a grinding process whereby the chipbreaker depression and associated features are ground into the insert body.

It has been found that a metal cutting insert incorporating the chip control features described herein provides significantly improved chip control over a wide variety of metalcutting operations such as turning, grooving and facing. Additionally, the new insert configuration facilitates the manufacturing process. What has been described is an improved cutting insert with chip control features and a method for the manufacture of such cutting inserts.

What is claimed is:

1. An improved cutting insert with chip control features comprising an insert body having end wall regions having a predetermined width and defining in part a cutting edge and sides and top and bottom walls generally perpendicular to said sides, said insert body being invertible about an axis perpendicular to said sides thereof, said insert body having cutting edges at said end wall regions, whereby in each inverted position of said insert body a respective cutting edge is presented uppermost at the same end of said insert body, said top and bottom walls of said insert body defining therein engaging means for cooperating with a toolholder clamp means; a land region extending rearwardly from each said end wall region cutting edge toward said respective top or bottom wall and defining a surface region of a predetermined width; a back ramp extending generally upwardly from each said land region to said respective top or bottom wall; and a chipbreaker means defining a depression initiating in a forward portion of the land region proximate the cutting edge and extending into said back ramp, wherein said chipbreaker means depression bisects said back ramp such that two step-like features are defined in combination by said back ramp and land region and wherein said chipbreaker means depression having a pair of generally parallel side walls which are perpendicular to the cutting edge.

2. The improved cutting insert according to claim 1 wherein the chipbreaker means depression is preferably characterized by a constant radius.

3. The improved cutting insert according to claim 1 wherein the cutting edge is of a first predetermined width and the chipbreaker means is of a second predetermined width which is between approximately one third to one half of the first predetermined width.

4. The improved cutting insert according to claim 1 wherein the back ramp ascends from the land toward the respective top or bottom wall at an approximate angle of between about 30 to 60 degrees relative to an imaginary line perpendicular to the land.

5. The improved cutting insert according to claim 1 wherein the back ramp is of a predetermined height as measured from the land of between about 0.005 to 0.020 inches.

6. The improved cutting insert according to claim 1 wherein the back ramp is a predetermined distance from the cutting edge which is selected to be approximately three to five times greater than a predetermined feed rate of the cutting insert.

7. The improved cutting insert according to claim 4 wherein the cutting edge is of a first predetermined width and the chipbreaker means is of a second predetermined width which is between approximately one third to one half of the first predetermined width.

8. The improved cutting insert according to claim 7 wherein the back ramp is of a predetermined height as measured from the land of between about 0.005 to 0.020 inches.

9. The improved cutting insert according to claim 8 wherein the back ramp is a predetermined distance from the cutting edge which is selected to be approximately three to five times greater than a predetermined feed rate of the cutting insert.

10. The improved cutting insert according to claim 1 wherein the engaging means for cooperating with the toolholder clamp means is a notch which is substantially "V" shaped in cross section.

11. In combination with a cutting tool holder adapted to retain as cutting insert therein by means of insert retailing means, a cutting insert with improved chip control features comprising an insert body having end wall regions having a predetermined width and defining in part a cutting edge and sides and top and bottom walls generally perpendicular to said sides, said insert body being invertible about an axis perpendicular to said sides thereof, said insert body having cutting edges at said end wall regions, whereby in each inverted position of said insert body a respective cutting edge is presented uppermost at the same end of said insert body, said top and bottom walls of said insert body defining therein engaging means for cooperating with a toolholder clamp means; a land region extending rearwardly from each said end wall region cutting edge toward said respective top or bottom wall and defining a surface region of a predetermined width; a back ramp extending generally upwardly from each said land region to said respective top or bottom wall; and a chipbreaker means defining a depression initiating in a forward portion of the land region proximate the cutting edge and extending into said back ramp, wherein said chipbreaker means depression bisects said back ramp such that two step-like features are defined in combination by said back ramp and land region and wherein said chipbreaker means depression having a pair of generally parallel side walls which are perpendicular to the cutting edge.

12. The improved cutting insert according to claim 11 wherein the chipbreaker means depression is preferably characterized by a constant radius.

13. The improved cutting insert according to claim 11 wherein the cutting edge is of a first predetermined width and the chipbreaker means is of a second predetermined width which is between approximately one third to one half of the first predetermined width.

14. The improved cutting insert according to claim 11 wherein the back ramp ascends from the land toward the respective top or bottom wall at an approximate angle of between about 30 to 60 degrees relative to an imaginary line perpendicular to the land.

15. The improved cutting insert according to claim 11 wherein the back ramp is of a predetermined height as measured from the land of between about 0.005 to 0.020 inches.

16. The improved cutting insert according to claim 11 wherein the back ramp is a predetermined distance from the cutting edge which is selected to be approximately three to five times greater than a predetermined feed rate of the cutting insert.

17. The improved cutting insert according to claim 14 wherein the cutting edge is of a first predetermined width and the chipbreaker means is of a second predetermined width which is between approximately one third to one half of the first predetermined width.

18. The improved cutting insert according to claim 17 wherein the back ramp is of a predetermined height as measured from the land of between about 0.005 to 0.020 inches.

19. The improved cutting insert according to claim 18 wherein the back ramp is a predetermined distance from the cutting edge which is selected to be approximately three to five times greater than a predetermined feed rate of the cutting insert.

20. The improved cutting insert according to claim 11 wherein the engaging means for cooperating with the toolholder clamp means is a notch which is substantially "V" shaped in cross section.

* * * * *